July 21, 1964  S. K. ARNESS  3,141,482
CORE MILL
Filed July 19, 1961  3 Sheets-Sheet 3
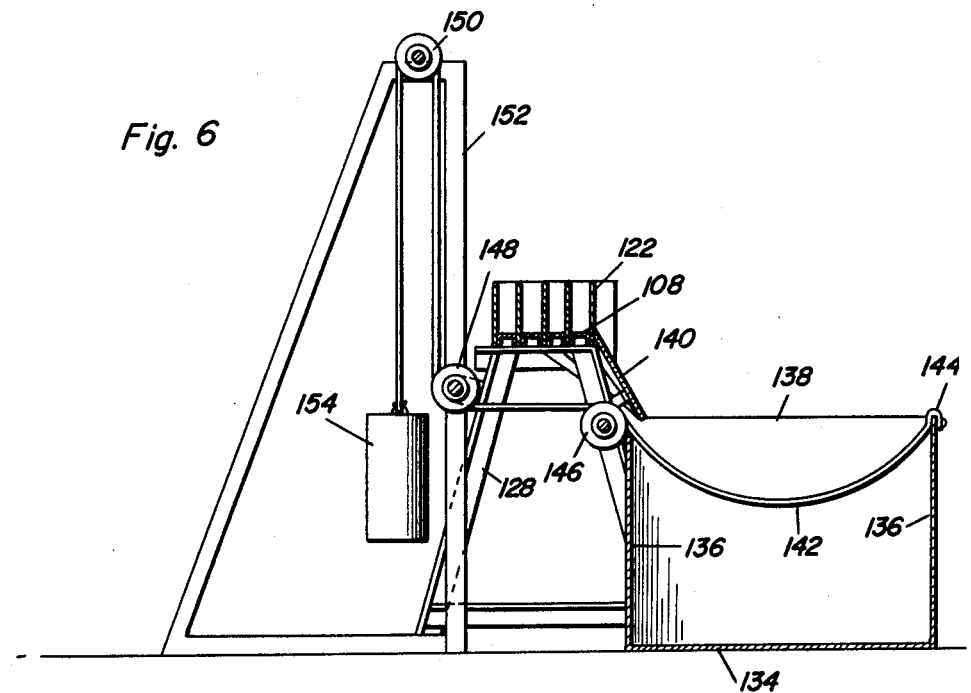
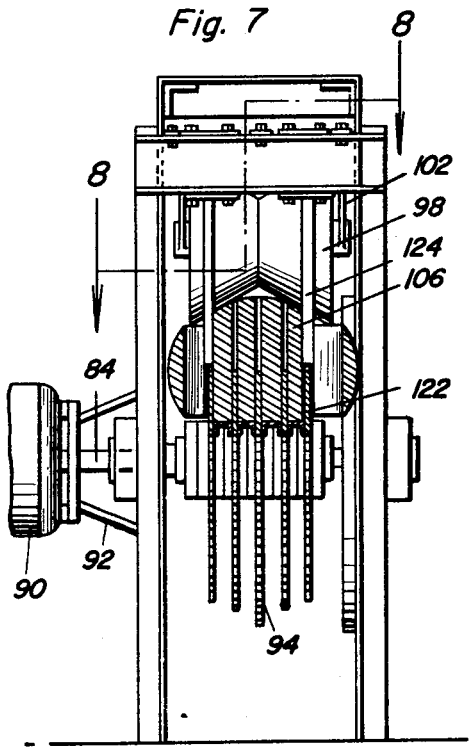
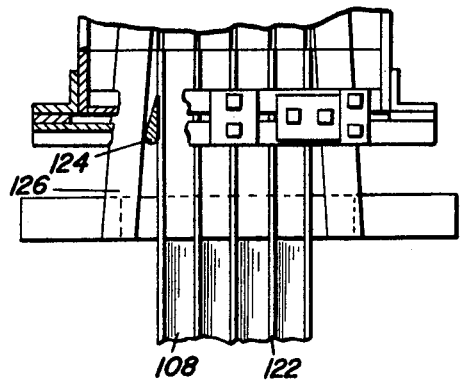
Sam K. Arness
INVENTOR.
BY *Clarence A. O'Brien
and Harvey B. Jacobson*
Attorneys United States Patent Office 3,141,482
Patented July 21, 1964

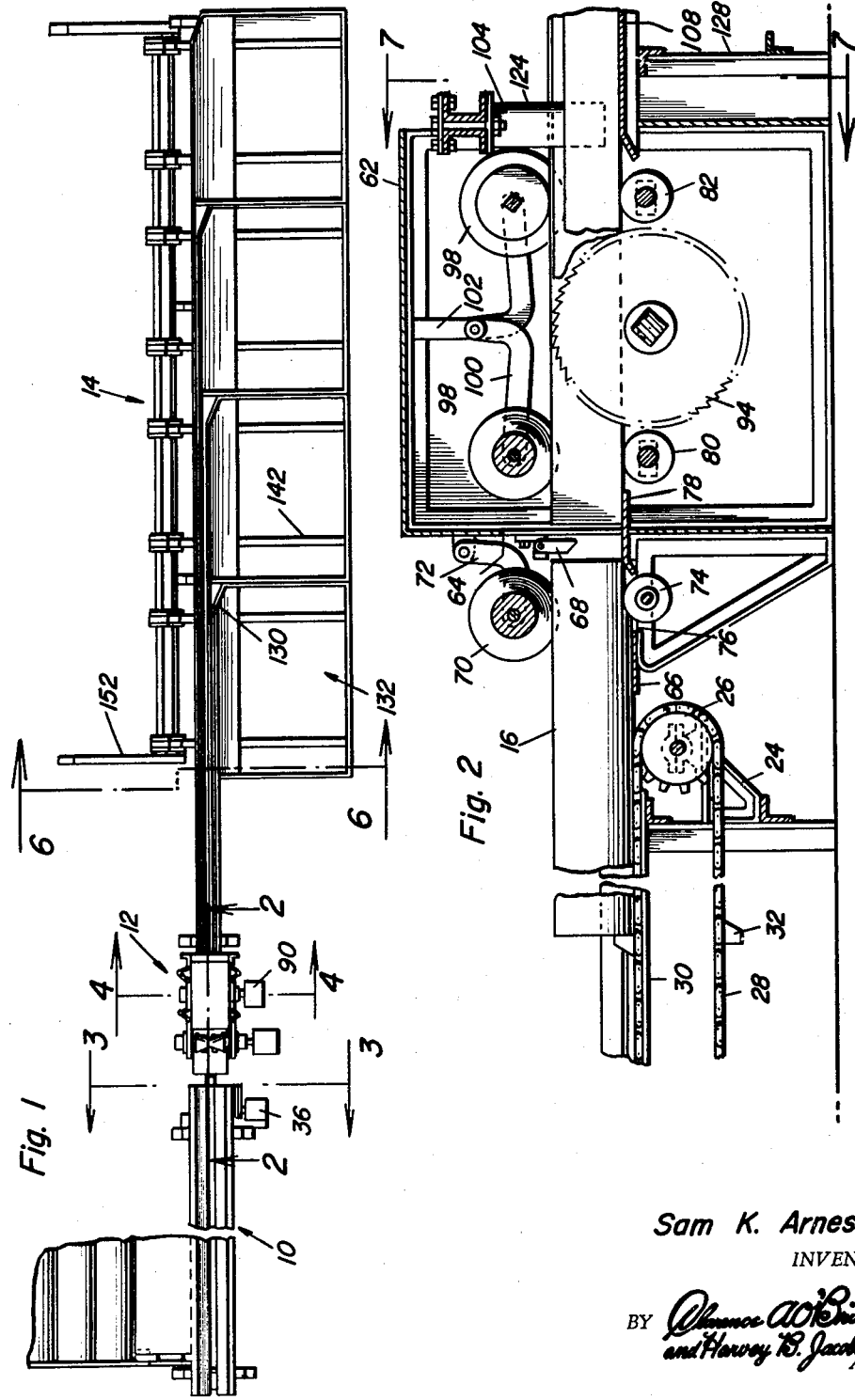

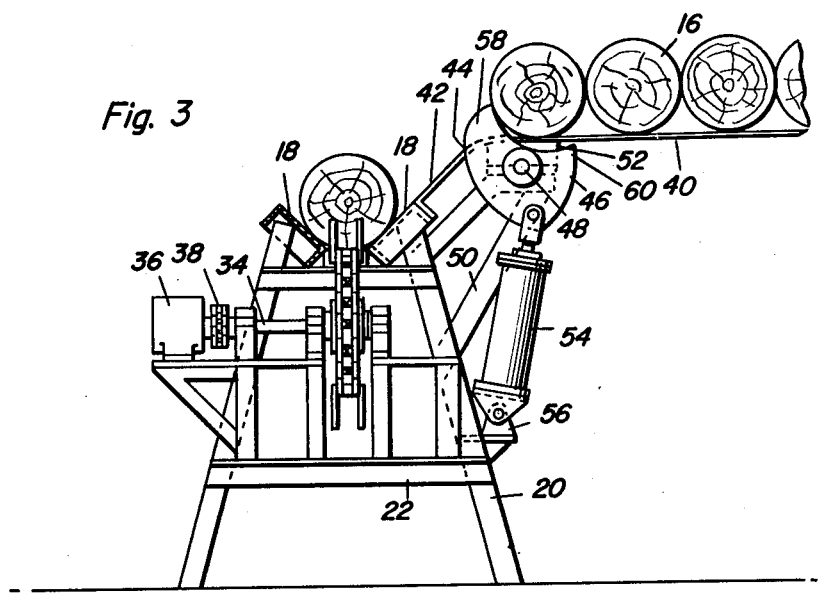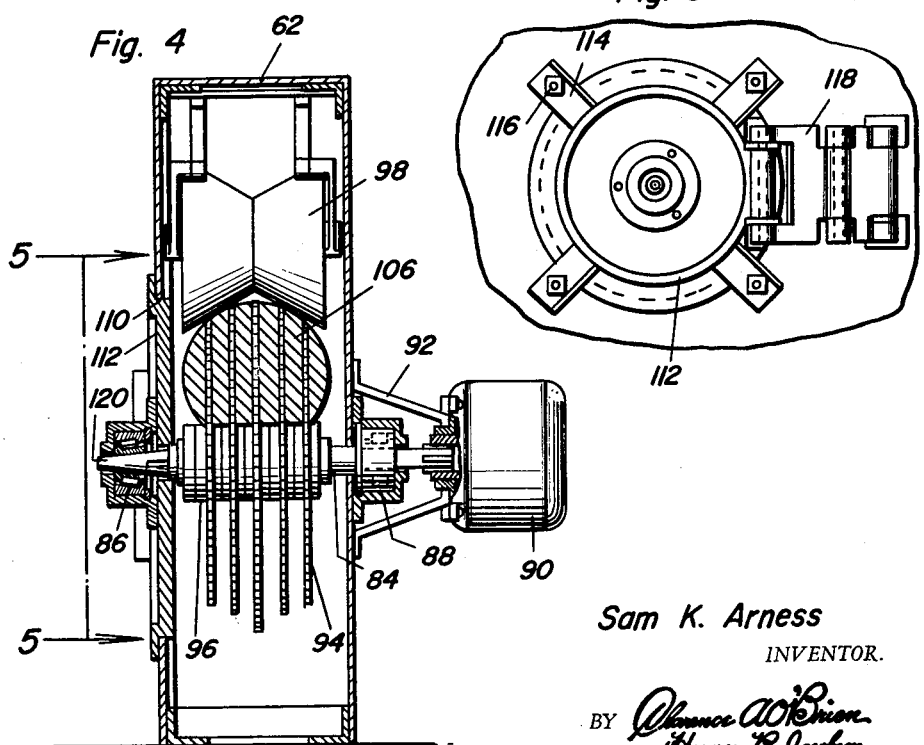

3,141,482
CORE MILL
Sam K. Arness, P.O. Box 426, Hoopa, Calif.
Filed July 19, 1961, Ser. No. 125,270
9 Claims. (Cl. 144—39)

The present invention generally relates to a device for manufacturing useful lumber out of wood cores which are produced as a residual by plywood lathes or the like.

In the formation of plywood, the plywood lathes yield a relatively thin panel from the outer wood of a log. The center core or heart of the log is not used in forming plywood and it is the primary object of the present invention to provide a mill for manufacturing lumber from such plywood cores and discharging such lumber into bins or the like for strapping into bundles.

The invention consists generally of a feed table which delivers the cores into a planer which, by use of planer heads and knives, prepares the core for passage through a gang saw that cuts precisely to preset dimensions so that the maximum utilization is made of the core for the production of lumber such as framing or studding two inches by four inches in dimension and of whatever length desired within the limits of the cores passed through the machine. From the gang saw, the lumber is discharged into receptacles in accordance with the dimensions thereof from where it can be strapped and bundled for further processes. Basically, the squaring of the core is accomplished by planing prior to the sawing operation and the sawing operation is precisely measured according to the core log diameter size in order to derive maximum yield from the core in one pass through the machine and the subsequent deposit into bin receptacles eliminates costly handling.

Generally, in a saw mill, the log is "squared up" prior to cutting which results in a considerable waste of wood. In the present invention, the planing device only planes two grooves in the bottom of the core thereby eliminating much kerf loss. The grooving not only faces two cants smoothly but also permits the severed pieces formed from the core to enter the sorting table in between metal grooves for splitting off of slabs and for sorting. With this mill, the conventional procedure for disposing of the cores in a plywood producing plant is eliminated which previously has required the labor of several individuals and also some means for transporting the cores away from the plywood mill.

Another object of the present invention is to provide a core mill having a novel structural assembly which is quite simple in operation, long lasting and dependable, efficient, easy to repair and generally inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view of the core mill of the present invention;

FIGURE 2 is a longitudinal, vertical sectional view, on an enlarged scale, taken substantially upon a plane passing along section line 2—2 of FIGURE 1 illustrating the details of construction of the gang saw assembly;

FIGURE 3 is a transverse, sectional view taken substantially upon a plane passing along section line 3—3 of FIGURE 1 illustrating the feed table and the mechanism for individually feeding the logs from inclined skids or the like onto the feed table;

FIGURE 4 is a transverse, sectional view taken substantially upon a plane passing along section line 4—4 of FIGURE 1 illustrating the relationship of the gang saw to the hold-down rollers;

FIGURE 5 is a detailed sectional view taken substantially upon a plane passing along section line 5—5 of FIGURE 4 illustrating the removable door construction which enables access to the interior of the casing enclosing the gang saw assembly for repair and maintenance thereof;

FIGURE 6 is a transverse, sectional view taken substantially upon a plane passing along section line 6—6 of FIGURE 1 illustrating further structural details of the bins or receptacles for receiving the cut pieces of lumber;

FIGURE 7 is a detailed sectional view taken substantially upon a plane passing along section line 7—7 of FIGURE 2 illustrating further structural details of the gang saw assembly; and FIGURE 8 is a detailed sectional view taken substantially upon a plane passing along section line 8—8 of FIGURE 7 illustrating the construction of the splitters which separate the slabs from the center pieces of lumber formed from the core.

Referring now specifically to the drawings, the core mill of the present invention includes an in-feed table assembly generally designated by the numeral 10, a gang saw assembly generally designated by the numeral 12 and a sorting and discharging assembly generally designated by the numeral 14 which are arranged in longitudinal tandem alignment whereby a single pass of a core 16 will cut the cylindrical core into a plurality of useful pieces of lumber. The cores 16 are of substantially identical cylindrical configuration depending upon the particular plywood lathe on which it was formed. For example, the diameter of the core may be seven and three-quarter inches or nine and one-half inches or any other dimension depending upon the particular structure of the plywood lathe.

The in-feed table 10 includes a pair of longitudinally extending inclined supporting panels 18 which are supported stationarily by downwardly diverging legs 20 interconnected by suitable bracing 22. Mounted on the leg assemblies 20 by suitable brackets 24 is a pair of end sprockets 26 on which a conveyor sprocket chain 28 is mounted. The upper run of the conveyor chain 28 is disposed between the spaced lower edges of the inclined supporting panels 18 and form a support for the cores 16 and a backing plate 30 is provided for the upper run of the conveyor chain 28 thus adequately supporting the cores 16.

Mounted in longitudinally spaced relation on the chain 28 is a plurality of outwardly extending lugs 32 which are spaced apart a distance greater than the normal length of the cores 16 wherein one of the lugs 32 will engage the outer end of a core 16 and move it toward the gang saw assembly 12. One of the sprockets 26 is provided with an extension shaft 34 connected with a suitable electric motor 36 whereby the conveyor chain 28 may be driven. The electric motor 36 is connected to the shaft 34 by a suitable coupling 38 of any suitable structural details. Thus, as the logs or cores 16 are disposed in the crotch formed by the inclined supporting plates or panels 18, the lugs 32 will engage the outer end thereof and move the core 16 longitudinally of the in-feed table 10.

For supplying the core 16 to the crotch formed by the inclined plates 18, there is provided an inclined supporting ramp or skid 40 having a downwardly inclined edge portion 42 joined with the outer edge of one of the inclined plates 18. At the juncture of the inclined edge 42 and the remainder of the skid or platform 40, there is provided a slot 44 through which a feeding plate 46 may extend. The plate 46 is pivotally supported on a shaft 48 carried by brackets 50 supported from the leg assembly 20 and the plate 46 is generally arcuate in configuration and provided with an arcuate recess 52 in one edge thereof for engaging with the periphery of the core 16.

At one corner of the plate 46, a fluid pressure operated piston and cylinder assembly 54 is connected and the other end of the assembly 54 is connected with a bracket 56 on the leg assembly 20 whereby extension and retraction of the piston and cylinder assembly 54 will cause oscillation of the plate 46 The arcuate notch or recess 52 in the edge of the plate 46 defines end portions 58 and 60 which are arranged in such a manner that the end 58 will be disposed in the path of movement of a core 16 when in normal position. When the piston and cylinder assembly 54 is extended from the position shown in FIGURE 3, the plate 46 will be pivoted thus lowering the forward end or nose 58 of the plate 46 out of the path of the core 16 thus enabling the core to move down the inclination of the edge 42 into the crotch formed by the inclined panels 18 As the front or nose end 58 of the plate moves downwardly, the rear end 60 moves upwardly around the periphery of the core 16 into the path of movement of the adjacent core 16 thus preventing entry of but one log or core at a time There may be provided a single plate 60 or a multiplicity of plates mounted on a single longitudinal shaft all of which may operate in unison from a single piston and cylinder assembly 54 which may be manually controlled by a suitable valve connecting the cylinder assembly to a source of pressure fluid thus enabling manual selective operation of the in-feed table for supplying sufficient core stock to the gang saw assembly.

The gang saw assembly includes an enlarged hollow casing 62 having an enlarged inlet opening 64 facing the conveying chain 28 and receiving the core therefrom. The casing or cabinet 62 is provided with a supporting plate 66 for receiving the end of the core 16 and pivotal anti-kick-back members 68 are supported on the cabinet 62 immediately above the core 16 as it enters the opening 16 for thus preventing the core from kicking back from the casing 62. Mounted above the opening 64 is a pair of facing frusto-concial holddown rollers 70 carried by L-shaped arms 72 for holding the core down against driven planing heads 74 including knives (not shown) and which extend upwardly through an opening 76 in the plate 66. The end of the plate 66 which extends through the opening 64 is designated by numeral 78 and is slightly elevated above the entrance plate 66.

Disposed in the casing 62 is a pair of rollers 80 and 82 which engage the core prior to and after it passes through the gang saw assembly which includes a transversely extending shaft 84 journalled on suitable bearing assemblies 86 and 88 with one end of the shaft 84 being conencted with an electric motor 90 supported by a bracket 92 in alignment with the shaft 84. Mounted on the shaft 84 is a plurality of circular saws 94 which are disposed in spaced relation by virtue of spacers 96. The circular saws 94 vary in diameter with the largest diameter saw being in the center and the saws decreasing in diameter outwardly towards the ends of the shaft 84 for purposes of just extending through the core 16 as it is being sawed inasmuch as the core is provided with a cylindrical upper surface. For retaining the core against the rollers 80 and 82 and in proper relation to the circular saw blade 94 there is provided two pairs of inwardly facing frusto-concial rollers 98 each of which is supported by L-shaped arms 100 carried by a depending bracket 102 supported from the top of the casing 62. The orientation of the frusto conical rollers is illustrated specifically in FIGURE 4 and also in FIGURE 2.

The casing 62 is also provided with a discharge opening 104 for passage of the pieces of lumber 106 cut from the core 16. The bottom of this opening 104 is defined by an elongated table or plate 108 forming part of the sorting and discharging assembly to be described hereinafter.

On wall of the casing 62 is provided with an enlarged opening 110 having a plate 112 mounted therein. The plate 112 is secured in place by radially extending lugs 114 and fasteners 116. One edge of the plate 112 is supported by a double hinge assembly 118 which enables the plate 112 to be swung away from the casing 62. The plate 112 provides a support for the bearing 86 and the ends of the shaft 84 received in the bearing 86 is tapered as at 120 thus enabling disconnection of the bearing 86 from the end of the shaft 120 so that the plate 112 may be moved laterally outwardly for enabling inspection of, repair of or removal and replacement of the saws 94 as may be required during normal use. In view of the double hinge 118, the initial movement of the plate 112 will be substantially straight out from the shaft 84 thus enabling disconnection between the tapered end 102 of the shaft 84 and the bearing assembly 86.

The sorting assembly 14 includes a plurality of divider plates 122 extending perpendicularly upwardly from the elongated table 108 for supporting the pieces 106 in separate tracks. Disposed in the dischargin opening 104 is a pair of depending splitters 124 which are substantially wedge-shaped in configuration as illustrated in FIGURE 8 whereby the edge pieces or slabs 126 will be separated from the useful cut pieces 106 and discharged laterally of the conveying table 108 prior to entry into the sorting portion thereof and such slabs may be conveyed away from the mill in any suitable manner.

The table 106 is supported in any suitable manner such as by leg assemblies 128 and the various plates 122 terminate in outwardly inclined end portions 130 which will deflect the cut pieces into one of the plurality of receptacles generally designated by numeral 132, each of which includes a bottom 134, side walls 136 and end walls 138. An inclined chute or plate 140 will guide pieces of lumber into the receptacle or in bin 132 where they will come to rest upon a flexible strap 142 having one end 144 attached to the outer upper edge of the side wall 136. The other end of the flexible strap 142 passes over a roller 146 and then around a roller 148 generally in alignment therewith. The flexible member 142 then extends over the top idler roller 150 supported by a stand assembly 152 and the terminal end of the strap 142 is connected with a counterbalance weight 154 whereby the weight 154 will be elevated as the bin 132 is filled with pieces of lumber thus pushing the strap 142 downwardly into the bin 132. Each of the bins is provided with a similar structure for enabling the strap to be disposed in encircling relation to the pieces of lumber disposed within bin 132.

The cores 16 make a single pass through the machine where they are formed into useful pieces of lumber and then separated and discharged into bins or receptacles in order to facilitate the strapping of the pieces of lumber into a bundle for easier handling thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A core mill comprising a gang saw assembly including support means defining an elongated support upon which a core may be supported and axially shifted, a housing disposed intermediate the remote ends of said support and including upstanding side walls, a large opening formed in one of said side walls, a closure plate for said opening removably secured thereover and including a first bearing, a second bearing supported from said other side wall and aligned with said first bearing, a blade shaft extending between and having its opposite ends journaled in said first and second bearings, and a plurality of circular saw blades mounted on said shaft for rotation therewith and at points spaced longitudinally therealong, said larger opening having a diameter larger than said circular saw blades whereby said closure plate may be removed and said shaft blades may be removed from between said side walls and outwardly of said opening.

2. The combination of claim 1 wherein said closure plate is secured to said one side wall by means of a double hinge thereby enabling said closure plate, when being initially removed, to be moved outwardly from said one side wall while maintaining its medial plane in parallell relation to its position when said closure plate is secured over said opening.

3. The combination of claim 1 wherein said support means includes upstanding partitions extending longitudinally thereof for embracingly receiving the boards cut from said core by a passage through said saw blades, the ends of said partitions remote from said saw blades terminating successively in laterally inclinned end portions for successively deflecting said bores to one side of said support means at locations spaced longitudinally therealong.

4. The combination of claim 3 including a bin disposed at each of said locations alongside said one side of said support means for receiving the boards discharged at that location.

5. The combination of claim 4 including a flexible strap means adapted to underlie the boards discharged at each of said locations and having one end attached to the corresponding bin, and counterbalance means attached to the other end of each of said strap means for rotating said strap means above the bottom of the corresponding bin and progressively yielding under the increasing weight of the boards supported by said strap means to lower said bores into said bins.

6. The structure as defined in claim 1 wherein said mill includes a planer assembly including planer heads with knives thereon projecting slightly above said support adjacent said shaft for flattening certain areas of a core as it is shifted axially through said blades.

7. The combination of claim 1 including anti-kick-back means mounted on said housing for preventing the core from moving rearwardly in relation to the housing, and rollers spaced longitudinally of the gang saws and above the saws for holding the core downwardly for engagement by the saws.

8. The structure as defined in claim 1 wherein said saw blades are of different diameters and arranged with the larger blades in the center and the outer blades progressively dimensioning in diameter corresponding to the curvature of the cores.

9. The combination of claim 1 wherein said support means includes upstanding partitions extending longitudinally thereof for embracingly receiving the bores cut from said core by a passage through said saw blades, the ends of said rows remote from said saw blades terminating successively in laterally inclined end portions for successively deflecting said bores to one side of said support means at locations spaced longitudinally therealong splitter members on each side of said support adapted for separating the edge pieces cut from the core by the smaller of saw blades.

References Cited in the file of this patent

UNITED STATES PATENTS

| | | |
|---|---|---|
| 851,083 | Froslid | Apr. 23, 1907 |
| 1,039,312 | Miles | Sept. 24, 1912 |
| 1,741,951 | Pelton | Dec. 31, 1929 |
| 1,825,041 | Barbare | Sept. 29, 1931 |
| 1,842,419 | Morris | Jan. 26, 1932 |
| 2,788,032 | Lee | Apr. 9, 1957 |
| 2,800,225 | McColl et al. | July 23, 1957 |
| 2,821,301 | Montague | Jan. 28, 1958 |

FOREIGN PATENTS

| | | |
|---|---|---|
| 969,007 | Germany | Apr. 17, 1958 |